United States Patent [19]
Iijima et al.

[11] 3,891,065
[45] June 24, 1975

[54] MOVABLE FRAME FIXING DEVICE

[75] Inventors: Katsuhiko Iijima, Tokyo; Katsuhiko Yoshida, Sagamihara, both of Japan

[73] Assignee: Mitsubishi Jukogyo Kabushiki Kaisha, Tokyo, Japan

[22] Filed: May 17, 1974

[21] Appl. No.: 471,059

[30] Foreign Application Priority Data
May 31, 1973 Japan............... 48-62256

[52] U.S. Cl................ 188/41; 172/272; 248/2; 188/67
[51] Int. Cl................................ B61h 7/00
[58] Field of Search.................. 188/41, 42, 43, 67; 172/272, 667; 248/2, 16

[56] References Cited
UNITED STATES PATENTS

| | | | |
|---|---|---|---|
| 1,414,250 | 4/1922 | Bellowy................. | 188/43 |
| 2,339,181 | 1/1944 | Martin................... | 248/16 |
| 2,839,164 | 6/1958 | Roussel.................. | 188/67 |
| 2,994,138 | 8/1961 | Fourlan.................. | 248/16 |
| 3,233,350 | 2/1966 | Malzahn et al........... | 172/272 |
| 3,840,095 | 10/1974 | Matson.................. | 188/42 |

FOREIGN PATENTS OR APPLICATIONS
1,486,423   5/1967   France................. 188/43

*Primary Examiner*—Trygve M. Blix
*Assistant Examiner*—Edward Kazenske
*Attorney, Agent, or Firm*—Cushman, Darby & Cushman

[57] ABSTRACT

A movable frame fixing device for fixing a movable frame, which can move horizontally, to a support frame on a fixed side by fastening with a hydraulic pressure; characterized in that a wedge member is interposed upwardly between a hydraulic cylinder mounted horizontally in the lower portion of the movable frame and a lower guide member so as to be freely rockable, and that the surface of the lower guide member to be contacted with the wedge member is inclined along the inclined surface of the wedge member to generate a vertical fastening force $n$ and a horizontal fastening force $m$ from a horizontal thrust pressure of a piston produced by said hydraulic cylinder, whereby the movable frame may be fixed to the support frame of the fixed side.

1 Claim, 4 Drawing Figures

PATENTED JUN 24 1975  3,891,065

SHEET 1

MOVABLE FRAME FIXING DEVICE

The present invention relates to an improved movable frame fixing device, in which a hydraulic lock of a movable frame for fixing the same in position with respect to a fixed side after it has been moved horizontally, is made stronger than the conventional movable frame fixing devices.

Heretofore, for instance, in excavating apparatuses such as a back-hoe in the construction machines, a body to be slide horizontally relative to a vehicle body is generally fixed, through the steps of fixedly securing a support frame provided with two parallel, upper and lower, linear beams as guide members to the rear side of the vehicle body, and fastening a movable frame adapted to be guided by said linear beams to said support frame on the excavator side with bolts and nuts, while engaging claws provided at the top and the bottom of the movable frame with said support frame.

In the case of fastening with the bolts and the nuts, upon sliding the movable frame an operator must get off the vehicle body to loosen the nuts and slide the movable frame, and thereafter he must again fasten the nuts. In addition, since these bolts are designed so as to be fastened with a so large torque that they may withstand against the dead load of the excavator and the reaction force for the excavating force, it is very difficult to fasten the bolts and nuts outside of a factory, and furthermore, there have often occurred destructive accidents caused by insufficient fastening of the bolts.

Also in the hydraulic locking devices which have recently come to use, the movable frame is adapted to be fastened to the upper and lower guide beams with a hydraulic pressure instead of employing bolts and nuts, and accordingly, although the fastening in the direction of the hydraulic pressure force is achieved, with regard to a direction perpendicular to said direction, that is, with regard to the vertical direction the movable frame is supported merely by the frictional force produced along the contact surface between the guide beams and the piston end surface of the hydraulic cylinder owing to the hydraulic pressure force. Accordingly there is a fear that shipping may occur along the contact surface.

The present invention has been worked out on the aforementioned background, and according to one feature of the invention, in a movable frame fixing device for fixing a movable frame, which can move horizontally as guided by guide beams of a support frame mounted on a fixed side, onto the support frame on the fixed side by fastening with a hydraulic pressure, a wedge member is interposed between a fixing cylinder provided horizontally on the movable frame and the support frame on the fixed side so as to be freely rockable, and a contact surface between said support frame and the wedge member is inclined with respect to the fixing cylinder to thereby generate a vertical fastening force $n$ and a horizontal fastening force $m$.

Now preferred embodiments of the present invention will be described with reference to the drawings.

Figure 1:
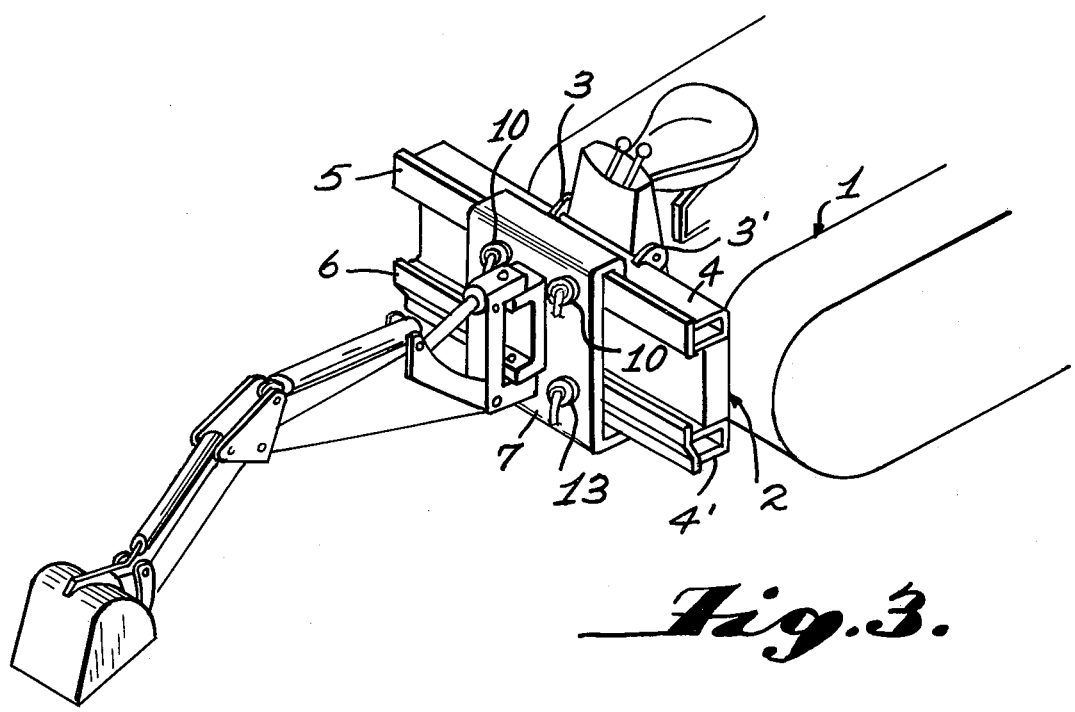
FIG. 1 is an outside perspective view of an excavating machine mounted at the rear portion of a tractor and incorporated with the device according to the present invention.
Figure 3:
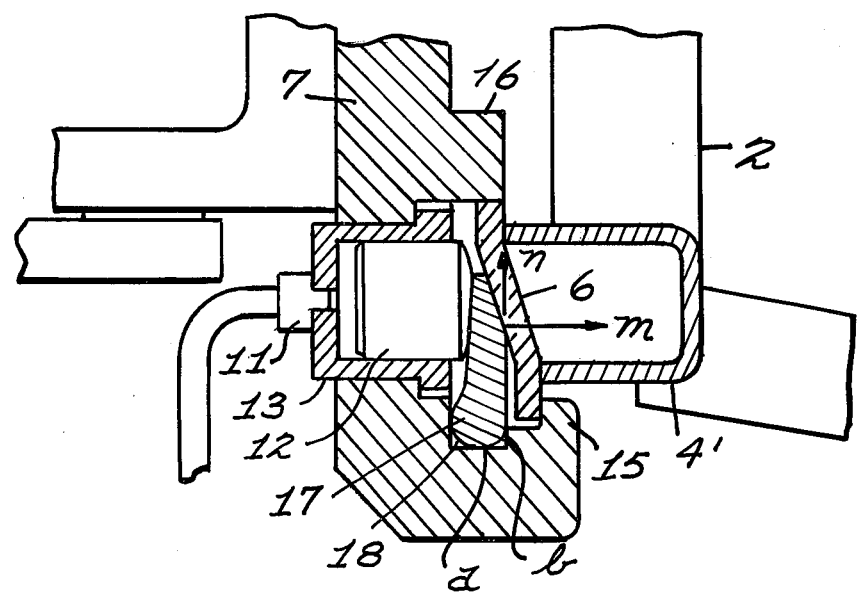
FIG. 3 is an enlarged partial longitudinal cross-section view of the proximity of the wedge member shown in FIG. 2.
Figure 2:
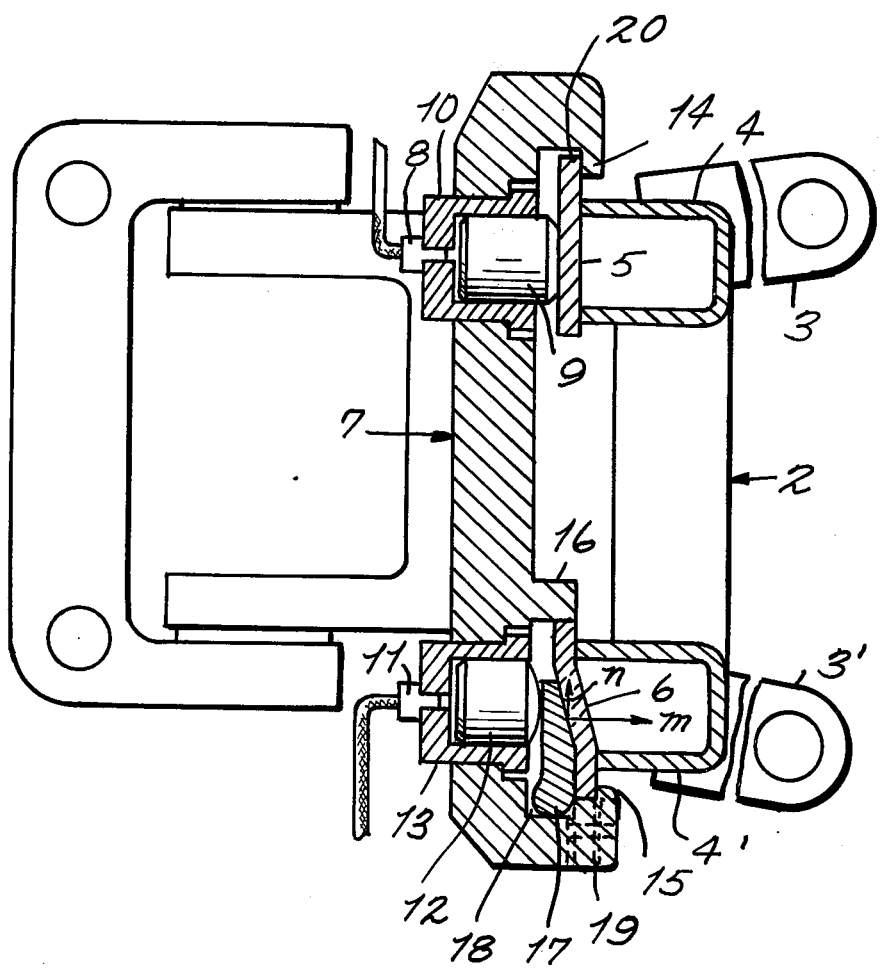
FIG. 2 is an enlarged longitudinal cross-section view of one preferred embodiment of the device according to the present invention as shown in FIG. 1.

In FIGS. 1 to 3, FIG. 1 shows an outside view of an excavator according to one embodiment in which the subject device of the present invention is incorporated, FIG. 2 shows an essential part of the device according to the present invention, and FIG. 3 is a partial enlarged view of FIG. 2.

Reference numeral 1 designates a vehicle body, numeral 2 designates a support frame mounted to the vehicle body with an upper and a lower pairs of brackets 3 and 3', numerals 4 and 4' represent beams made of channel steel mounted in parallel to each other at the top and the bottom of the support frame 2, numeral 5 designates a flat planar guide member of desired length that is fixedly secured to the upper beam 4 of the support frame 2 as directed in the front direction, and numeral 6 designates a planar guide member having a desired length and an inclined width portion that is fixedly secured to the lower beam 4' of the support frame 2 as directed in the front direction.

Reference numeral 7 designates a movable frame of an excavating machine that is engaged with said support frame 2 and horizontally movable along the upper and lower guide members 5 and 6. To this movable frame 7 are mounted a pair of left and right upper cylinders 10 each having an oil inlet-outlet port 8 and a piston 9 as well as a similar pair of lower cylinders 13 each having an oil inlet-outlet port 11 and a piston 12, and the hydraulic pressures exerted by these cylinders are adapted to be applied to the support frame 2. The upper and lower ends of the movable frame 7 are formed in a hook shape, and these hook-shaped portions have an upper claw 14 and a lower claw 15, respectively, which are adapted to be engaged with the upper guide member 5 and the lower guide member 6, respectively, of the support frame 2.

At the lower portion of the rear surface of the movable frame 7 is provided a protrusion 16, and the bottom surface of said protrusion 16 makes contact with the top edge surface of the lower guide member 6 of the lower beam 4'. Between the top edge surface of said upper guide member 5 and the lower surface of the upper hook-shaped portion of the movable frame 7 is retained a certain gap clearance 20.

Between said lower guide member 6 and the piston 12 of the lower cylinder 13 is interposed a wedge member 17 having an inclined surface on one side as directed upwardly. The base portion of said wedge member 17 is arcuated in cross-section and fitted in a groove 18 at the lower portion of the movable frame 7. As shown in FIG. 3, said wedge member 17 is not fixed either to the support frame 2 nor the movable frame 7, but it can be freely rocked along the inner surface of the groove 18 of the movable frame 7 while keeping contact thereto at points $a$ and $b$.

It is to be noted that the end surface of the piston 12 in the lower cylinder 13 to be pushed against the wedge member 17 is finished in a spherical form, while the end surface of the piston 9 in the upper cylinder 10 is finished in a plane form. In addition, in the lower portion of the movable frame 7 are provided a pair of, left and right, rollers 19 for enabling the movable frame 7 to slide smoothly.

Explaining now the operation of the subject device having the above-mentioned construction, for the purpose of fixing the movable frame 7 to the support frame 2, a pressurized oil is fed to the upper and lower cylinders 10 and 13 through the oil inlet-outlet ports 8 and 11. Then at the upper cylinder 10, the piston 9 is pushed against the upper guide member 5 of the support frame 2 by the pressurized oil, while the entire excavator device is displaced on the opposite side to the vehicle body 1 by the reaction force until the claw 14 is brought in contact with and pushed against the guide member 5, and thereby the movable frame 7 is fastened to the upper beam 4.

At the lower cylinder 13, when a pressurized oil is fed through the oil inlet-outlet ports 11 to the cylinder 13, the piston 12 is pushed against the wedge member 17.

Since the wedge member 17 has its lower portion finished to have an arcuated cross-section as shown in FIG. 3, it rotates while keeping contact with the inner surface of the groove 18 of the movable frame 7 at point $a$ and point $b$, and is thus pushed against the inclined surface of the lower guide member 6 of the lower beam 4'. It is to be noted that since the surface of the piston 12 to be contacted with the wedge member 17 is finished in a spherical form, the rotation of the wedge member 17 can be realized smoothly.

In addition, since the surface of the wedge member 17 to about on the surface of the lower guide member 6 is given a similar inclination to the inclined surface of the wedge member 17 so that it may conform to said inclined surface when fastened by the piston 12, when the wedge member 17 is pushed against the lower guide member 6, not only a force $m$ directed in the axial direction of the piston 12 is generated to make the lower guide member 6 fastened by the claw 15 of the movable frame 7, but also another force $n$ directed in the vertical direction is generated to make the lower guide member 6 also fastened by the protrusion 16.

A torque for counterbalancing the torque caused by the excavating force and the dead load of the excavator device, is generated by the fastening forces $m$ in the axial direction of the cylinders produced at the upper and lower portions of the movable frame 7, while the force $n$ generated by the intermediary of the wedge member 17 at right angles to the axis of the cylinder, is counterbalanced by the excavating force and the force caused by the dead load of the excavator device.

In order to release the fastening between the movable frame 7 and the support frame 2, it is only necessary to discharge the pressurized oil in the upper and lower hydraulic cylinders 10 and 13. Then the respective fastening forces disappear and the excavator device merely hangs over the support frame 2 via the upper and lower claws 14 and 15 and the protrusions 16, so that the excavator device can easily slide along the guide members 5 and 6.

Figure 4:
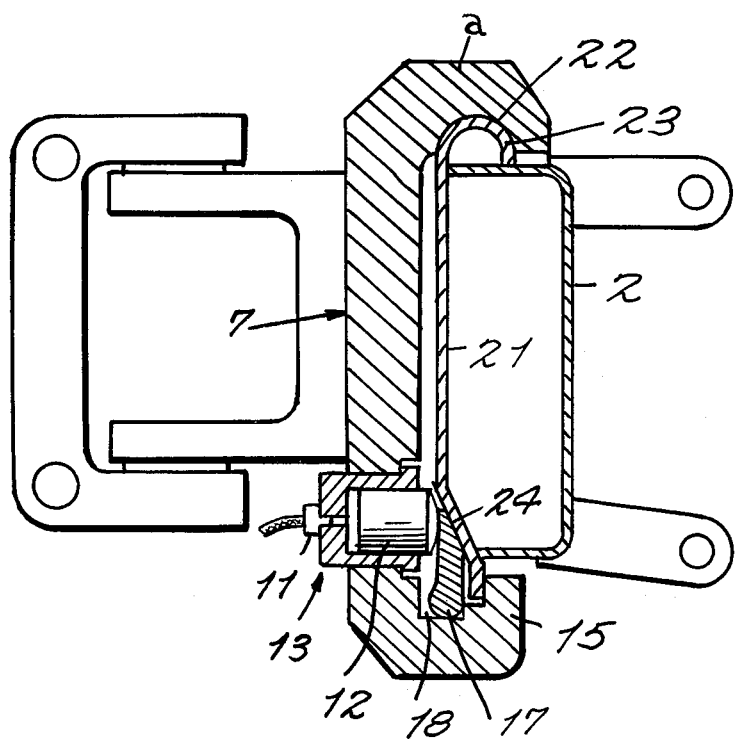
FIG. 4 is a longitudinal cross-section view of another embodiment of the device according to the present invention.

FIG. 4 shows an alternative embodiment, in which reference numerals similar to those given in the above embodiment designate the same elements.

According to this alternative embodiment, the first embodiment is modified in such manner that the upper cylinders are omitted, and that a hydraulic section comprises only lower cylinders. In the lower portion of a movable frame 7 is provided a hydraulic cylinder 13, and on the lower surface of an upper hook-shaped portion $a$ is formed a groove 23 having a semi-circular cross-section.

On the other hand, a guide member 21 extending in the vertical direction is mounted to a support frame 2, at the top of said guide member 21 is formed a guide surface 22 having the same semi-circular cross-section as said groove 23 to be fitted in said groove 23, and at the lower portion of the guide member 21 is formed a guide surface 24 having an inclination along the inclined surface of a wedge member 17.

The movable frame 7 is placed on the guide surface 22 of the support frame 2 at its groove 23, and the hook-shaped portion $a$ also achieves the function of a claw.

In addition, the lower portion of the movable frame 7 is engaged with the support frame 2 by means of a claw 15.

Between the lower guide surface 24 of the support frame 2 and the piston 12 of the cylinder 13 is interposed the wedge member 17, and as described previously, the wedge member 17 can be rocked while keeping contact with the inner surface of the groove 18 of the movable frame 7, without being fixed with respect to either the movable frame 7 nor the support frame 2.

If a pressurized oil is fed through the oil inlet-outlet port 11 to the cylinder 13 for fixing the movable frame 7 to the support frame 2, then the piston 12 is pushed against the wedge member 17. The wedge member 17 is rotated while keeping contact with the inner surface of the lower groove 18 of the movable frame 7, and pushed against the inclined guide surface 24 of the support frame 2, so that a fastening force directed in the axial direction of the cylinder is generated for fastening the movable frame 7 to the support frame 2 with the claw 15, and also another fastening force perpendicular to the axial direction is generated for fastening the movable frame 7 to the support frame 2 with the groove 23 of semi-circular cross-section by the intermediary of the wedge member 17.

In order to release the fastening between the movable frame 7 and the support frame 2, it is only necessary to discharge the pressurized oil in the cylinder 13. Then the fastening forces disappear, and there remains a state where the movable frame 7 is merely placed on the support frame 2 via the groove 23.

As described above, according to the present invention, in the conventional fastening and fixing device in which a movable frame that is slidable horizontally with respect to a fixed side is hydraulically fixed to the fixed side, a rockable wedge member that is applied with a hydraulic pressure from a hydraulic cylinder has its inclined surface pushed against an inclined surface of a support frame so that a force $m$ in the axial direction of the hydraulic cylinder as well as another force $n$ perpendicular to the axial direction may be generated, and therefore, the fastening of the movable frame to the fixed side can be made extremely reliable in comparison to the conventional devices. In addition, since the wedge member is not fixed at all except for that it is pinched with a hydraulic pressure, the device is simple in structure, and generates no useless forces. The fastening and releasing operations of the movable frame are easy and controllable with an one-touch action, and so improvements in the working efficiency can be expected.

What is claimed is:

1. A movable frame fixing device for fixing a movable frame, which can move horizontally, to a support frame on a fixed side by fastening with a hydraulic pressure; characterized in that a wedge member is interposed upwardly between a hydraulic cylinder mounted horizontally in the lower portion of the movable frame and a lower guide member so as to be freely rockable, and that the surface of said lower guide member to be contacted with the wedge member is inclined along the inclined surface of the wedge member to generate a vertical fastening force $n$ and a horizontal fastening force $m$ from a horizontal thrust pressure of a piston produced by said hydraulic cylinder, whereby the movable frame may be fixed to the support frame of the fixed side.

* * * * *